Dec. 1, 1942.  D. McL. FROTHINGHAM  2,303,349
EXTRUSION MECHANISM
Filed April 1, 1940  4 Sheets-Sheet 1

INVENTOR.
DONALD McL. FROTHINGHAM
BY
ATTORNEYS.

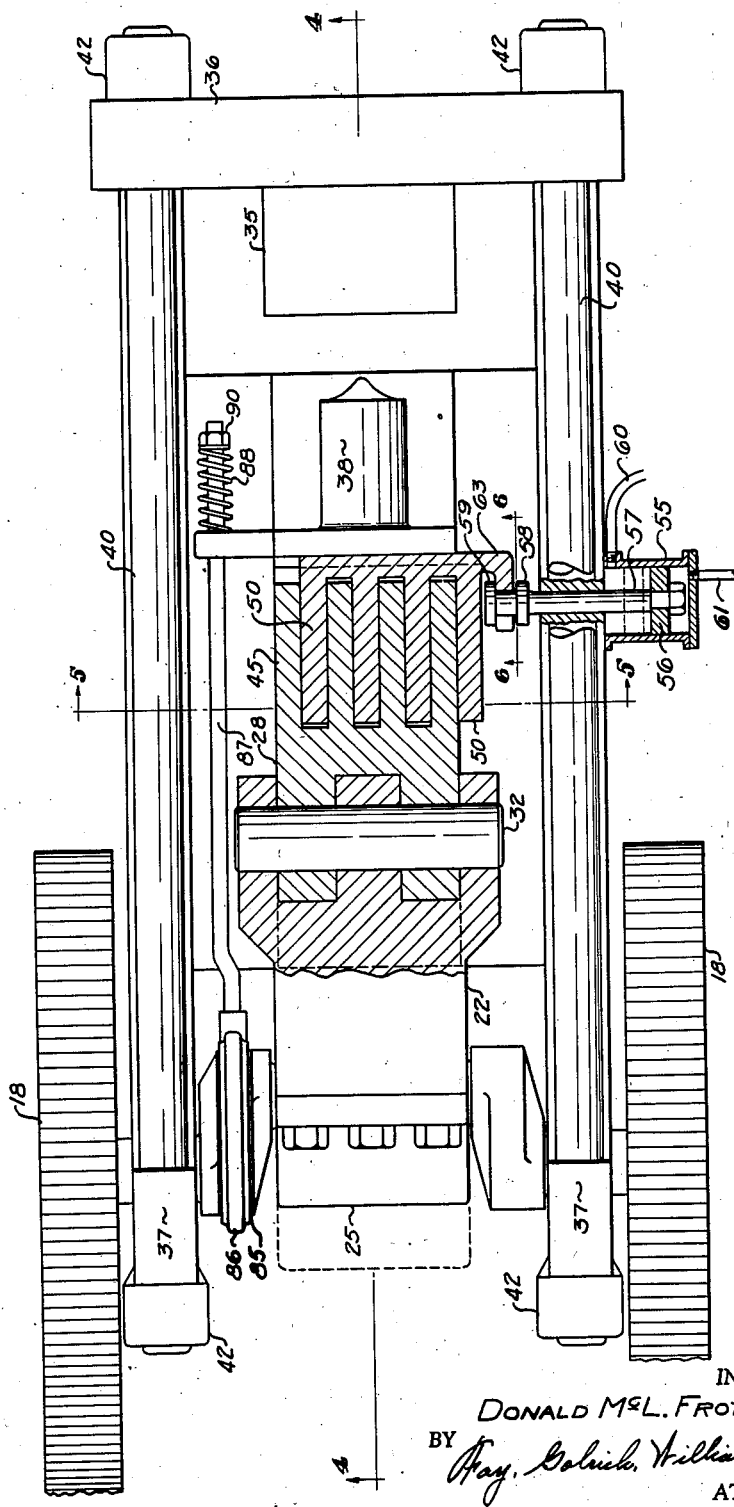

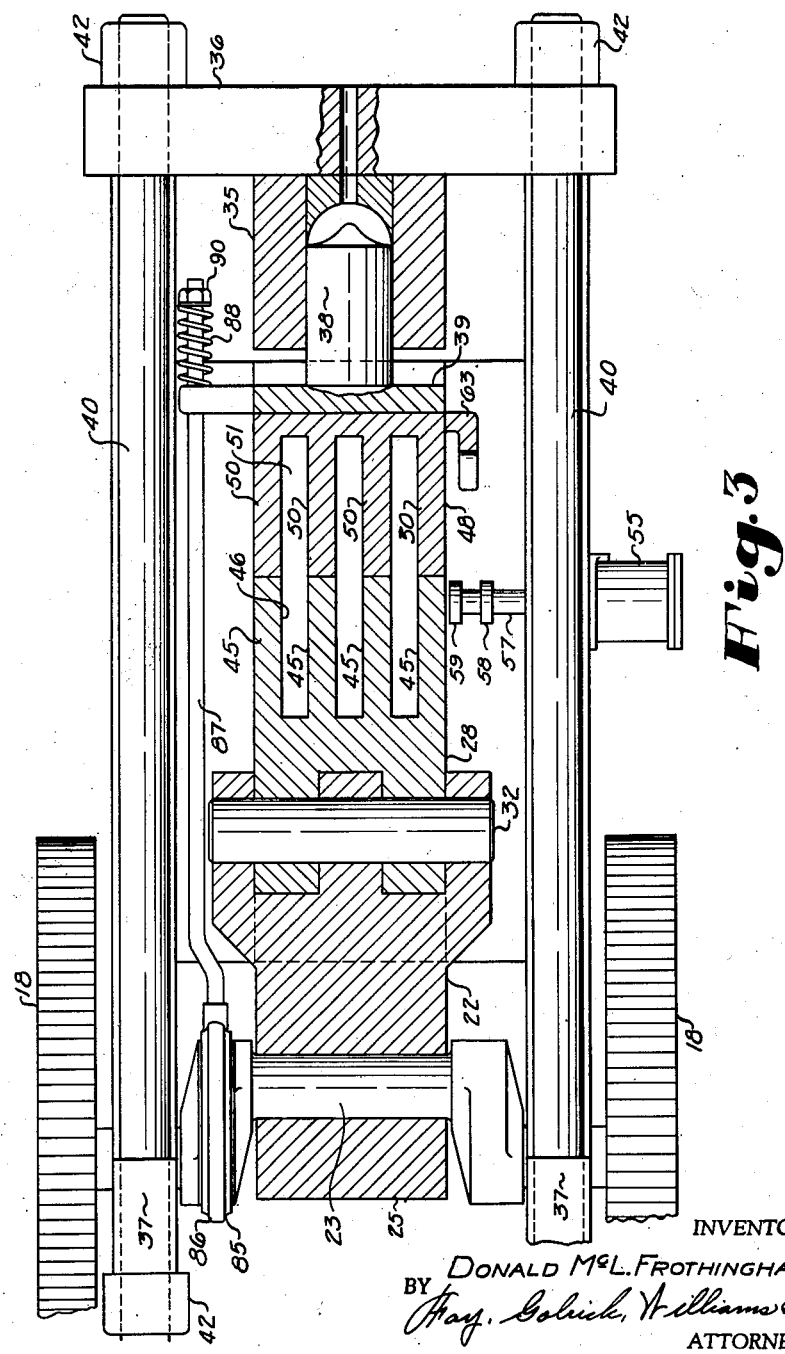

Dec. 1, 1942.  D. McL. FROTHINGHAM  2,303,349
EXTRUSION MECHANISM
Filed April 1, 1940  4 Sheets-Sheet 4
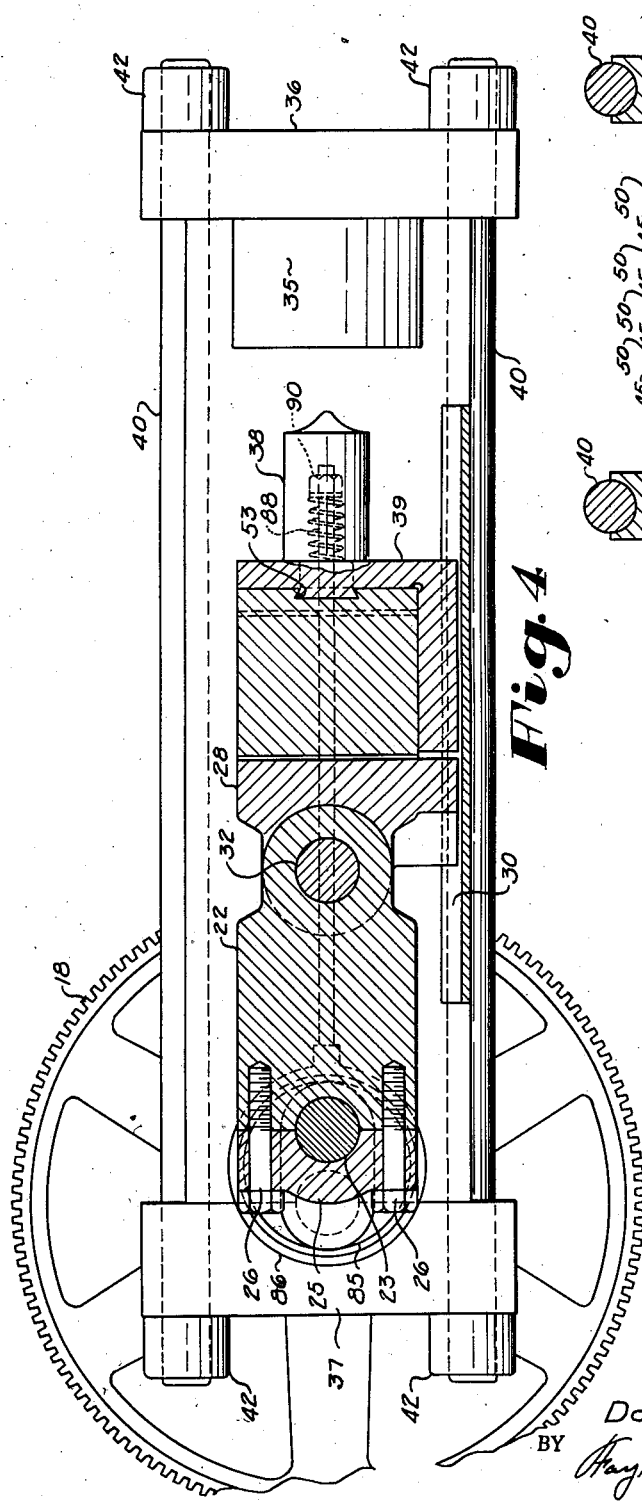
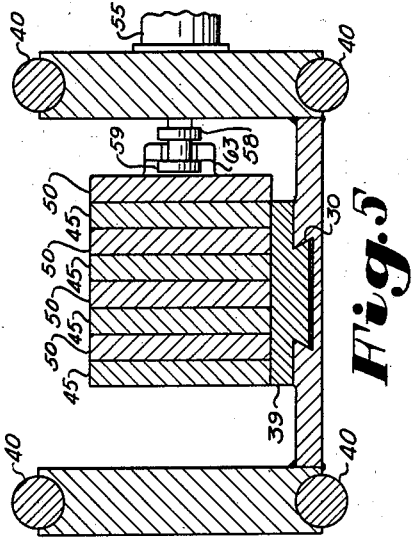
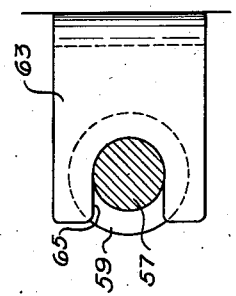
INVENTOR.
DONALD McL. FROTHINGHAM
BY
ATTORNEYS Patented Dec. 1, 1942

2,303,349

UNITED STATES PATENT OFFICE 2,303,349

EXTRUSION MECHANISM

Donald McL. Frothingham, Noroton, Conn., assignor to Ferrex Corporation, New York, N. Y., a corporation of Delaware Application April 1, 1940, Serial No. 327,172

4 Claims. (Cl. 207—1)

This invention is directed to a machine for forming material under pressure and particularly to a machine for extrusion under large total pressures.

Extrusion presses are well known in the art, but have been heretofore limited in size due to the available power capacity to drive the press. This has resulted in a limitation either in the cross-section extruded or in the type of material handled. For instance, if a relatively soft material were handled it could be extruded in relatively large cross-section and, on the other hand, a material resistant to extrusion required so much force that the extruded cross-section was necessarily quite small.

Insofar as I am aware a cardinal difficulty in building extrusion presses of large capacity has been the provision of a separable connection between the power source, generally including a flywheel or the like, and the die mechanism which, while positive in action, could also handle very large total pressures. Any of the clutch devices at present known are open to objection because they are not capable of transmitting the required load except in sizes so large as to be prohibitive; it being understood that I contemplate the use of extrusion pressures totaling several thousand tons.

The chief object of my invention has been to provide a connection between a power source and the die mechanism proper which can be easily made and broken to permit extrusion or to permit the idle travel of the source of power during reloading of the die. Since it is not practical to stop the power source after such extrusion stroke, in the interests of power economy, a further object has been to provide a flywheel or other source of kinetic energy which can be built up in power capacity while a die is being reloaded and then positively connected through the medium of my invention to the die assembly for the actual extrusion stroke.

To the accomplishment of the foregoing and related ends, said invention, then, consists of the means hereinafter fully described and particularly pointed out in the claims; the annexed drawings and the following description setting forth in detail certain means of carrying out the invention, such disclosed means illustrating, however, but one of various ways in which the principle of the invention may be used.

In said annexed drawings:

Fig. 2 is an enlarged view showing part of the mechanism of Fig. 1 in an inactive position;

Fig. 3 is a view similar to Fig. 2 showing the mechanism in position for extrusion;

Fig. 4 is a section through Fig. 2 as indicated by the lines 4—4 thereon;

Fig. 5 is a section through Fig. 2 as indicated by the lines 5—5 thereon;

Fig. 6 is a detail section as indicated by the lines 6—6 on Fig. 2; and

In general my invention contemplates the use of a flywheel driven from a suitable power source and operative to drive a crankshaft, to which is affixed a slide. A ram and die assembly for extrusion are mounted opposite to the die slide and spaced therefrom. An interposer is mounted between the die assembly and the slide and in the active position is engaged by the slide and acts against the die assembly to permit power from the slide to effect the extrusion stroke. In the inactive position the interposer permits free reciprocation of the slide without movement of the die assembly during the slug changing interval. At the same time the flywheel can continue to rotate and build up sufficient kinetic energy to actuate the die assembly through the slide and interposer on the next extrusion stroke. Means are provided to return the driven part of the die assembly at the conclusion of the extrusion cycle to its initial position and automatic control mechanism is provided to insure the working of the parts in synchronism.

In the following specification the interposer is described as located directly between the slide and an extrusion ram to force the latter into the die. It will be understood that alternative arrangements are within the scope of my invention. For instance, the interposer can be mounted behind the die, in which position it will not act on the ram if this is desired.

Figure 1:
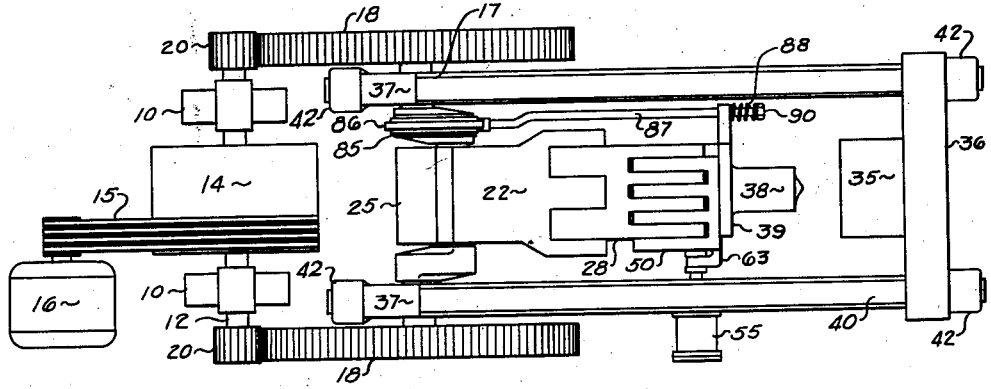
Fig. 1 is a plan view of a machine embodying my invention.

Referring now to Fig. 1, on a suitable foundation I provide a pair of bearing pedestals 10 which receive a jack-shaft 12 carrying a flywheel 14. The flywheel 14 is V-belt driven as at 15 from a motor 16, or other source of power.

A crankshaft is mounted parallel with the jackshaft and is journalled in a frame 17 of the mechanism. At each end of the crankshaft are bull gears 18 which are driven from pinions 20 carried by the jackshaft. By this arrangement it is possible to employ a flywheel of relatively small size and rotate the same at a speed sufficient to impart the desired R. P. M. to the crankshaft through the speed reduction of the pinions 20 and gears 18.

A connecting link 22 is mounted on the eccentric 23 of the crankshaft and is secured thereto by a cap 25 and bolts 26.

A slide 28, mounted for reciprocation in a dovetail slot 30 (Fig. 5) is pivotally secured at 32 to the link and is reciprocated in the dovetail slot thereby.

The die mechanism comprises a die 35 removably bolted to an end plate 36 and a ram 38 removably bolted to an interposer block 39 hereafter described.

To absorb the operating thrust of the crankshaft end plates 37 are provided which directly receive the thrust from the crankshaft bearings. The end plates 36 and 37 are connected by heavy tie rods 40, capped at each end as at 42. Thus the operating strains during extrusion are not transmitted primarily through the base of the machine, but are carried by the tie rods 40.

The interposer block 39 is mounted for reciprocating movement in the dovetail slot 30. Both the slide and the block are adapted to be operated as a unit during extrusion by the use of a mechanical interposer. To this end the slide 28, as best shown in Fig. 3, is formed at its free end with a series of parallel sided teeth 45. The space between each opposing pair of teeth is indicated at 46 and is of a width corresponding to the tooth width plus sliding clearance.

The mechanical interposer, indicated at 48, is provided with a series of teeth 50 corresponding to the teeth 45. Spaces between the teeth 50, as indicated at 51, are provided corresponding to the spaces 46. From the description thus far it will be apparent that the interposer, if moved transversely of the slide, may assume one of two positions, either the teeth 45 may be received in slots 51 and the teeth 50 in slots 46 for relative telescoping, or the teeth 50 and 45 may be in abutment. The former position is shown in Fig. 2 and the latter in Fig. 3.

To permit transverse movement of the interposer with respect to the link, the former is slidably mounted in a dove-tail way 53 formed in the interposer block 39 (Fig. 4). To shift the interposer as indicated, mechanism as shown in Figs. 2, 3 and 6 is provided.

This shifting mechanism comprises an air cylinder 55 in which is slidingly carried a piston 56 suitably sealed with respect to the cylinder side walls. A piston rod 57 protrudes through one end of the cylinder 55 and terminates in a pair of annular shoulders 58 and 59. Compressed air or oil under pressure may be admitted to either side of the piston 56 by fluid connections 60 and 61.

The interposer is engaged by the aforesaid mechanism through the medium of an arm 63 formed as shown in Figs. 2 and 6 and extending outwardly therefrom. In the position shown in Fig. 3, the extrusion position, the arm 63 has been carried from between the shoulders 58 and 59, such movement being permitted by the slot 65. On the return stroke, when the ram is returned to its initial position (Fig. 2) the piston rod 57 is in such position that the arm 63 rides between the shoulders 58 and 59.

Figure 7:
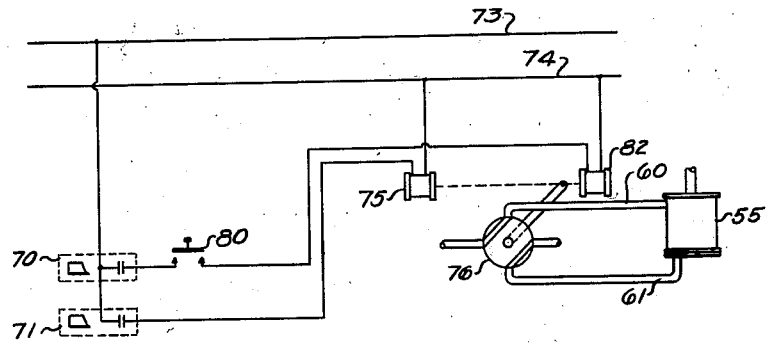
Fig. 7 is a wiring diagram showing the controls for the machine.

To control the movement of the rod 57 and the piston 56 operating fluid is admitted to one cr the other sides of the cylinder 55 through the medium of controls as shown in Fig. 7. These controls comprise a pair of normally open limit switches 70 and 71 mounted to be engaged by a cheek of the crankshaft during rotation. The switches are located to be engaged near the end of the ram withdrawal stroke and to this end are positioned on the left-hand side of the crankshaft axis (Fig. 4). Both are mounted to be engaged while the link 22, in its withdrawn position, is at the period of dwell of the crankshaft. The first switch engaged during rotation is the switch 71 and the second engaged is the switch 70. These may be positioned as much as seven or eight degrees on either side of dead center, depending on the clearance required and provided for traversing movement of the interposer.

As the switch 71 is closed, current from supply lines 73 and 74 actuates a solenoid 75 to shift a valve 76 to the position shown in Fig. 7. This opens the line 61 from the cylinder 55 to exhaust and the line 60 to air intake, thus moving the piston 56 toward the bottom of Fig. 2, shifting the interposer from the position of Fig. 3 to the idle position of Fig. 2. It will be understood that at this time the arm 63 is between the shoulders 58 and 59. This action takes place at the end of an extrusion cycle and, because the interposer is already in the shifted position, such action will not take place during succeeding idle strokes of the slide prior to the next extrusion stroke.

As the crankshaft continues its rotation, the limit switch 70 is closed. This switch is electrically connected with a manual starting switch 80 and through it operates to close a circuit, energizing a solenoid 82 by which the valve 76 is shifted from the position of Fig. 7 to a position in which the line 60 is connected to exhaust and the line 61 to air intake. In this position it is apparent that the piston 56 will be moved upwardly with respect to Fig. 2 and shift the interposer from the position of that figure to the position of Fig. 3. In this latter position all of the free travel of the slide 28 is eliminated and its idle reciprocation is converted into an extrusion stroke, by which the ram 38 is forced home into the die 35.

The starting switch 80 must be closed in order that the closing of the limit switch 70 shall be effective to shift the interposer and effect an extrusion stroke. In other words, after the parts have been returned to the position of Fig. 2, the closing of the limit switch 70 during each cycle of operation, will have no effect on the apparatus unless the manual starting switch 80 is also momentarily closed. The two switches 70 and 71 open as soon as the cam surface of the crankshaft cheek, by which they are actuated has passed thereby.

To return the ram 38 to the position shown in Fig. 1, namely, withdrawn from the die, an eccentric 85 is provided on the crankshaft. A collar 86 embraces the eccentric and is connected by a tie rod 87 with an arm on the interposer block 39. It will be noted that the connection is not positive, but is effected by means of a spring 88 positioned between the block and a nut 90 carried on the rod. Thus, the extruding motion of the ram is not interfered with, but upon removal of the pressure causing the extruding motion the spring 88, being of sufficient strength, withdraws the ram from the die and returns it to its initial position, simultaneously returning the arm 63 to a position between the shoulders 58 and 59.

In the matter of timing the parts, it will be apparent that the limit switch 71 must be so mounted that it will not close until engagement is effected between the said two shoulders and the arm 63 or such engagement will be impossible.

In operation, a slug of material to be extruded is placed in the die 35 and the manual operating switch 80 then closed. The flywheel and crankshaft which have been in continuous rotation will assume a position where the limit switch 70 is also closed. This energizes the solenoid 82 and shifts the valve 76 to cause piston 56 to move the interposer from the idly telescoping position of Fig. 2 to the abutting position of Fig. 3. As the crankshaft continues to be rotated the built-up kinetic energy of the flywheel 14 is transmitted to the slide 28 and, through the interposer, to the ram 38, driving the same home in the die 35, the extrusion thrust being absorbed by the tie rods 40.

At the end of the extrusion stroke the crankshaft has passed dead center and the engaging pressure between the slide 28, the block 39 and the interposer is removed. Hence the spring pressure of the spring 88 is sufficient to withdraw the ram 38 from the die 35 and cause the same to follow closely the return movement of the slide 28, carrying with it the interposer. Just prior to the time the crankshaft has reached the position where the switch 71 is closed, the arm 63 has again passed into the position between the shoulders 58 and 59. Thus, when the switch 71 is closed, the switch 70 being yet open, the piston 56 is shifted as above described to bring the interposer from the active position of Fig. 3 to the telescoping inactive position of Fig. 2. As the crankshaft continues its rotation and closes the switch 70 there is no transverse shifting of the interposer because the switch 80 will remain open and will not be again closed until a new slug of material has been placed in the die 35 and all is ready for the next extrusion stroke.

Other forms may be employed embodying the features of my invention instead of the one herein explained, change being made as regards the means herein disclosed, provided the elements stated by any of the following claims or the equivalent of such stated elements be employed.

I therefore particularly point out and distinctly claim as my invention:

1. In extrusion apparatus comprising a source of power, a crankshaft operatively connected thereto, a slide reciprocated by said shaft, an extrusion assembly comprising a ram and die movable relatively to each other and a rigid interposer mounted for sliding movement transversely and in line of the direction of the slide movement from an inactive position to a position for transmitting force from said slide to said extrusion assembly to effect relative movement between said ram and die, in combination hydraulic means capable of shifting said interposer transversely of said slide at a predetermined time in the cycle of operation of the crankshaft and electric means actuated by said crankshaft for controlling said hydraulic means.

2. In extrusion apparatus comprising a power source, a crankshaft operatively connected thereto, a slide reciprocated thereby, an extrusion assembly comprising a ram element and a die element movable relative to each other and a rigid interposer mounted for sliding movement transversely and in line of the direction of the slide movement from an inactive position to a position for transmitting force from said slide to said extrusion assembly to effect relative movement between said ram and die, in combination fluid controlled cylinder and piston means capable of shifting said interposer transversely of said slide at a predetermined time in the cycle of operation of said crankshaft, electric means actuated by said crankshaft for controlling said cylinder and piston means and resilient means normally tending to draw an element of said assembly and said slide relatively toward each other.

3. In an extrusion apparatus comprising a source of power, a crankshaft operatively connected thereto, a slide reciprocated by said shaft, an extrusion assembly comprising a ram and die movable relatively to each other and a rigid interposer mounted for sliding movement transversely and in line of the direction of the slide movement from an inactive position to a position for transmitting force from said slide to said extrusion assembly to effect relative movement between said ram and die, said slide and said interposer being formed with furcated ends opposite to one another and capable of idly telescoping or standing in abutment in the driving position, a cylinder mounted with its axis transverse to the movement of said slide, a piston in said cylinder and an electrically controlled valve to alternately apply fluid pressure to opposite sides of said piston to shift said interposer transversely with respect to said slide to an idle or abutting position with respect to said slide, as desired.

4. In an extrusion apparatus comprising a source of power, a crankshaft operatively connected thereto, a slide reciprocated by said shaft, an extrusion assembly comprising a ram and die movable relatively to each other and a rigid interposer mounted for sliding movement transversely and in line of the direction of the slide movement from an inactive position to a position for transmitting force from said slide to said extrusion assembly to effect relative movement between said ram and die, said slide and said interposer being formed with furcated ends opposite to one another and capable of idly telescoping or standing in abutment in the driving position, a cylinder mounted with its axis transverse to the movement of said slide, a piston in said cylinder, a valve to alternately apply fluid pressure to opposite sides of said piston to shift said interposer transversely with respect to said slide to said idle or abutting position with respect to said slide as desired, a solenoid for actuating said valve and a pair of limit switches actuated by said crankshaft for controlling current to said solenoid.

DONALD McL. FROTHINGHAM.